United States Patent
Walsh et al.

(10) Patent No.: US 9,672,342 B2
(45) Date of Patent: Jun. 6, 2017

(54) SYSTEM AND DEVICE BINDING METADATA WITH HARDWARE INTRINSIC PROPERTIES

(71) Applicant: Analog Devices, Inc., Norwood, MA (US)

(72) Inventors: John J. Walsh, Tampa, FL (US); John Ross Wallrabenstein, West Lafayette, IN (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 14/704,963

(22) Filed: May 5, 2015

(65) Prior Publication Data
US 2015/0318994 A1   Nov. 5, 2015

Related U.S. Application Data

(60) Provisional application No. 61/988,848, filed on May 5, 2014, provisional application No. 62/017,045, filed on Jun. 25, 2014.

(51) Int. Cl.
*H04L 9/32* (2006.01)
*G06F 21/32* (2013.01)
*H04L 9/30* (2006.01)

(52) U.S. Cl.
CPC ............ *G06F 21/32* (2013.01); *H04L 9/3066* (2013.01); *H04L 9/3218* (2013.01);
(Continued)

(58) Field of Classification Search
None
See application file for complete search history.

(56) References Cited

U.S. PATENT DOCUMENTS 7,564,345 B2   7/2009   Devedas et al.
7,581,248 B2   8/2009   Atkins et al.
(Continued)

FOREIGN PATENT DOCUMENTS

KR   20090104421 A   10/2009
WO   2010105993 A    9/2010
WO   2015200196 A   12/2015

OTHER PUBLICATIONS

Dwoskin et al., "Hardware-rooted Trust for Secure Key Management and Transient Trust," ACM Conference on Computer and Communications Security (CCS) 2007 (Alexandria, VA) p. 389-400.

(Continued)

*Primary Examiner* — Christopher Revak
(74) *Attorney, Agent, or Firm* — Wolf, Greenfield & Sacks, P.C.

(57) ABSTRACT

A system, device, and method for binding metadata, such as information derived from the output of a biometric sensor, to hardware intrinsic properties by obtaining authentication-related metadata and combining it with information pertaining to a root of trust, such as a physical unclonable function. The metadata may be derived from a sensor such as a biometric sensor, the root of trust may be a physical unclonable function, the combination of the metadata and root of trust information may employ a hash function, and output from such a hash process may be used as an input to the root of trust. The combined information can be used in interactive or non-interactive authentication.

20 Claims, 2 Drawing Sheets

(52) U.S. Cl.
CPC .......... *H04L 9/3221* (2013.01); *H04L 9/3226* (2013.01); *H04L 9/3231* (2013.01); *H04L 9/3236* (2013.01); *H04L 9/3278* (2013.01); *H04L 9/3297* (2013.01); *H04L 2209/805* (2013.01)

(56) References Cited

U.S. PATENT DOCUMENTS

| | | | |
|---|---|---|---|
| 7,653,197 | B2 | 1/2010 | Van Dijk |
| 7,702,927 | B2 | 4/2010 | Devedas et al. |
| 7,839,278 | B2 | 11/2010 | Devedas et al. |
| 7,926,089 | B2 | 4/2011 | Tulshibagwale et al. |
| 7,962,516 | B2 | 6/2011 | Bahrs et al. |
| 8,281,127 | B2 | 10/2012 | Hayes |
| 8,290,150 | B2 | 10/2012 | Erhart et al. |
| 8,346,951 | B2 | 1/2013 | Hayes |
| 8,379,856 | B2 | 2/2013 | Potkonjak |
| 8,386,990 | B1 | 2/2013 | Trimberger et al. |
| 8,418,006 | B1 | 4/2013 | Trimberger et al. |
| 8,458,489 | B2 | 6/2013 | Beckmann et al. |
| 8,463,813 | B2 | 6/2013 | Siress et al. |
| 8,468,186 | B2 | 6/2013 | Yu |
| 8,510,608 | B2 | 8/2013 | Futa et al. |
| 8,516,269 | B1* | 8/2013 | Hamlet ................. G06F 21/445 340/5.8 |
| 8,525,169 | B1 | 9/2013 | Edelstein et al. |
| 8,566,579 | B2 | 10/2013 | Armstrong et al. |
| 8,577,091 | B2 | 11/2013 | Ivanov et al. |
| 8,667,265 | B1* | 3/2014 | Hamlet ................. H04L 9/0866 326/80 |
| 8,782,396 | B2* | 7/2014 | Ziola ....................... G06F 21/31 713/155 |
| 8,844,009 | B2* | 9/2014 | Walsh .................. H04L 63/0876 380/277 |
| 8,848,905 | B1* | 9/2014 | Hamlet .................... H04K 1/04 380/35 |
| 8,868,923 | B1* | 10/2014 | Hamlet ...................... H04L 9/00 326/8 |
| 8,918,647 | B1 | 12/2014 | Wallrabenstein |
| 9,032,476 | B2 | 5/2015 | Potkonjak |
| 9,158,906 | B2 | 10/2015 | Guajardo Merchan et al. |
| 9,292,692 | B2 | 3/2016 | Wallrabenstein |
| 2003/0204743 | A1 | 10/2003 | Devedas et al. |
| 2005/0149496 | A1 | 7/2005 | Mukherjee et al. |
| 2005/0222896 | A1 | 10/2005 | Rhyne et al. |
| 2006/0210082 | A1 | 9/2006 | Devedas et al. |
| 2007/0036353 | A1 | 2/2007 | Reznik et al. |
| 2008/0069341 | A1 | 3/2008 | Relyea |
| 2008/0133912 | A1 | 6/2008 | Yamamoto et al. |
| 2008/0256549 | A1 | 10/2008 | Liu et al. |
| 2008/0256600 | A1 | 10/2008 | Schrijen et al. |
| 2009/0063860 | A1 | 3/2009 | Barnett et al. |
| 2009/0083833 | A1 | 3/2009 | Ziola et al. |
| 2010/0122093 | A1 | 5/2010 | Tuyls et al. |
| 2010/0127822 | A1 | 5/2010 | Devedas |
| 2010/0272255 | A1 | 10/2010 | Devedas et al. |
| 2010/0293384 | A1* | 11/2010 | Potkonjak ............. H04L 9/3247 713/176 |
| 2010/0293612 | A1* | 11/2010 | Potkonjak ................ G06F 21/34 726/20 |
| 2011/0002461 | A1 | 1/2011 | Erhart et al. |
| 2011/0033041 | A1 | 2/2011 | Yu et al. |
| 2011/0099117 | A1 | 4/2011 | Schepers et al. |
| 2011/0113392 | A1 | 5/2011 | Chakraborty et al. |
| 2011/0191837 | A1 | 8/2011 | Guajardo Merchan et al. |
| 2011/0215829 | A1 | 9/2011 | Guajardo Merchan et al. |
| 2011/0299678 | A1 | 12/2011 | Deas et al. |
| 2012/0072717 | A1 | 3/2012 | Hayes |
| 2012/0072737 | A1 | 3/2012 | Schrijen et al. |
| 2012/0137137 | A1 | 5/2012 | Brickell et al. |
| 2012/0183135 | A1 | 7/2012 | Paral et al. |
| 2013/0046990 | A1 | 2/2013 | Fahrny et al. |
| 2013/0051552 | A1 | 2/2013 | Handschuh et al. |
| 2013/0114810 | A1 | 5/2013 | Kobayashi et al. |
| 2013/0138710 | A1 | 5/2013 | Yamamoto et al. |
| 2013/0142329 | A1 | 6/2013 | Bell et al. |
| 2014/0108786 | A1 | 4/2014 | Kreft |
| 2014/0189890 | A1 | 7/2014 | Koeberl et al. |
| 2014/0279532 | A1* | 9/2014 | Tremlet .................. G06F 21/73 705/44 |
| 2015/0195088 | A1 | 7/2015 | Rostami et al. |
| 2015/0341792 | A1 | 11/2015 | Wallrabenstein et al. |
| 2016/0021096 | A1 | 1/2016 | Wallrabenstein |
| 2016/0170907 | A1* | 6/2016 | Walsh .................. H04L 9/0866 713/193 |

OTHER PUBLICATIONS

Tuyls et al., "Capacity and Examples of Template Protecting Biometric Authentication Systems," Biometric Authentication, vol. 3087 Lecture Notes in Computer Science, p. 158-170.

Frikken et al., "Robust Authentication Using Physically Unclonable Functions," 12th International Conference, ISC 2009, Pisa, Italy, Sep. 7-9, 2009, Information Security Lecture Notes in Computer Science, vol. 5735, 2009, pp. 262-277.

Rust (editor), "Report on use case and architecture requirements," Holistic Approaches for Integrity of ICT-Systems (Hint) (2013).

Armknecht et al., "A formalization of the security features of physical functions," Proceedings of the 2011 IEEE Symposium on Security and Privacy, SP '11, pp. 397-412, Washington, DC, 2011, IEEE Computer Society.

Abercrombie et al., "Secure Cryptographic Key Management System (CKMS) Considerations for Smart Grid Devices," CSIIRW '11 Proceedings of the Seventh Annual Workshop on Cyber Security and Information Intelligence Research, Article No. 59, New York, 2011.

Kerr et al., "PEAR: A Hardware Based Protocol Authentication System," SPRINGL '10 Proceedings of the 3rd ACM SIGSPATIAL International Workshop on Security and Privacy in GIS and LBS, ACM, New York, 2010.

Kerr, "Secure Physical System Design Leveraging PUF Technology," Master's Thesis, Univ. of Purdue, 2012.

Guajardo et al., "FPGA intrinsic PUFs and Their Use for IP Protection," Proceedings of the 9th Cryptographic Hardware and Embedded Systems Workshop (CHES), vol. 4727, 2007.

Guajardo et al., "Physical Unclonable Functions and Public-Key Crypto for FPGA IP Protection," International Conference on Field Programmable Logic and Applications, 2007.

Kish et al., "Physical Uncloneable Function Hardware Keys Utilizing Kirchhoff-Law Johnson-Noise Secure Key Exchange and Noise-Based Logic," Fluctuation and Noise Letters 12, 2013.

Maiti, "A Systematic Approach to Design an Efficient Physical Unclonable Function," Ph.D. Dissertation (Virginia Tech. 2012).

Maiti et al., "Physical Unclonable Function and True Random Number Generator: a Compact and Scalable Implementation," GLSVLSI '09 Proceedings of the 19th ACM Great Lakes symposium on VLSI, ACM, New York, 2009.

Kirkpatrick et al., "Physically Restricted Authentication and Encryption for Cyber-physical Systems," DHS Workshop on Future Directions in Cyber-physical Systems Security, 2009.

Kirkpatrick et al., "Enforcing Physically Restricted Access Control for Remote Data," Proceedings of CODASPY, 2011.

Kirkpatrick et al., "PUF ROKs: A Hardware Approach to Read-Once Keys," Proceedings of the 6th ACM Symposium on Information, Computer and Communications Security, ASIACCS 2011, Hong Kong, China, Mar. 22-24, 2011.

Kumar et al., "Extended abstract: The butterfly puf protecting ip on every fpga," Hardware-Oriented Security and Trust, HOST 2008, IEEE International Workshop on, pp. 67-70, 2008.

Suh et al., "Physical unclonable functions for device authentication and secret key generation," Proceedings of the 44th annual Design Automation Conference, DAC '07, pp. 9-14, New York, NY, 2007.

Ravikanth, "Physical one-way functions," Ph.D. Dissertation (MIT 2001).

Holcomb et al., "Initial sram state as a fingerprint and source of true random numbers for rfid tags," Proceedings of the Conference on RFID Security, 2007.

(56) References Cited

OTHER PUBLICATIONS

Zheng, "Digital Signcryption or How to Achieve Cost(Signature & Encryption) << Cost(Signature) + Cost(Encryption)," Advances in Cryptology, CRYPTO '97, vol. 1294 of Lecture Notes in Computer Science, pp. 165-179 (Springer 1997).
Hori et al., "Quantitative and Statistical Performance Evaluation of Arbiter Physical Unclonable Functions on FPGAs," 2010 International Conference on Reconfigurable Computing and FPGAs (ReCon-Fig), pp. 298-303 (2010).
Asim et al., "Physical Unclonable Functions and Their Applications to Vehicle System Security," Vehicular Technology Conference, VTC Spring 2009, IEEE 69th.
Rigaud (editor) in "D3.1 Report on Protocol choice and implementation," Holistic Approaches for Integrity of ICT-Systems (2014).
Ibrahim et al., "Cyber-physical security using system-level pufs," Wireless Communications and Mobile Computing Conference (IWCMC), 2011 7th Int'l, IEEE.
Peeters, "Security Architecture for Things That Think," Diss. Ph. D. thesis, Ku Leuven, Jun. 2012.
Peeters et al., "Toward More Secure and Reliable Access Control," Pervasive Computing, IEEE 11:3 (IEEE Computer Society 2011).
Owusu et al., "OASIS: on achieving a sanctuary for integrity and secrecy on untrusted platforms," Proceedings of the 2013 ACM SIGSAC conference on Computer & communications security (ACM, New York), p. 13-24.
Feiri et al., "Efficient and secure storage of private keys for pseudonymous vehicular communication," Proceedings of the 2013 ACM workshop on Security, privacy & dependability for cyber vehicles (ACM, New York), p. 9-18.
Pfaffhauser, "Protocols for MPC based on Unclonability," Master Thesis (ETH Zurich 2011).
Garcia-Alfaro, "Security Threat Mitigation Trends in Low-cost RFID Systems," Data Privacy Management and Autonomous Spontaneous Security (Springer Berlin Heidelberg 2010).
Niabeel et al., "Authentication and Key Management for Advanced Metering Infrastructures Utilizing Physically Unclonable Functions," IEEE SmartGridComm 2012 Symposium—Cyber Security and Privacy, 2012.
Potkonjak et al., "Differential Public Physically Unclonable Functions: Architecture and Applications," DAC '11 Proceedings of the 48th Design Automation Conference, ACM, New York, 2011.
Khandavilli, "A Mobile Role Based Access Control System Using Identity Based Encryption With Non-Interactive Zero Knowledge Proof of Authentication," Dalhousie University Repository, Faculty of Graduate Studies Online Theses, Apr. 5, 2012.
Rührmair et al., "Pufs in security protocols: Attack models and security evaluations," 2013 IEEE Symposium on Security and Privacy, 0:286-300, 2013.
Rührmair et al., "Modeling attacks on physical unclonable functions," Proceedings of the 17th ACM conference on Computer and communications security, CCS '10, pp. 237-249, New York, NY, 2010.
Rührmair et al., "Applications of high-capacity crossbar memories in cryptography," IEEE Trans. Nanotechnol., 10 (3):489-498, May 2011.
Goldwasser et al., "One-time programs, Proceedings of the 28th Annual conference on Cryptology: Advances in Cryptology," CRYPTO 2008, pp. 39-56, Berlin, Heidelberg, 2008, Springer-Verlag.
Tuyls et al., "Read-proof hardware from protective coatings," Proceedings of the 8th international conference on Cryptographic Hardware and Embedded Systems, CHES'06, pp. 369-383, Berlin, Heidelberg, 2006, Springer-Verlag.
Van Dijk et al., "Physical unclonable functions in cryptographic protocols: Security proofs and impossibility results," Cryptology ePrint Archive, Report 2012/228, 2012.
Handschuh et al., "Hardware intrinsic security from physically unclonable functions," Towards Hardware-Intrinsic Security, Information Security and Cryptography, pp. 39-53, Springer Berlin Heidelberg, 2010.
Paral et al., "Reliable and efficient puf-based key generation using pattern matching," Hardware-Oriented Security and Trust (HOST), 2011 IEEE International Symposium, pp. 128-133, Jun. 2011.
Yu et al., "Lightweight and secure puf key storage using limits of machine learning," Proceedings of the 13th International conference on Cryptographic hardware and embedded systems, CHES'11, pp. 358-373, Berlin, Heidelberg, 2011, Springer-Verlag.
Yu et al., "Recombination of physical unclonable functions," GOMACTech, 2010.
Yu et al., "Secure and robust error correction for physical unclonable functions," IEEE Des. Test, 27 (1):48-65, Jan. 2010.
Juels et al., "A fuzzy commitment scheme," Proceedings of the 6th ACM conference on Computer and communications security, CCS '99, pp. 28-36, New York, NY, 1999, ACM.
Brzuska et al., "Physically uncloneable functions in the universal composition framework," Advances in Cryptology—CRYPTO 2011—31st Annual Cryptology Conference, vol. 6841 of Lecture Notes in Computer Science, p. 51, 2011 Springer.
Gardner et al., "Toward Trusted Embedded Systems," 2nd Annual NSA Trusted Computing Conference & Exposition, Sep. 21, 2011, Orlando, FL.
Gassend et al., "Silicon physical random functions," Proceedings of the 9th ACM conference on Computer and communications security, CCS '02, pp. 148-160, New York, NY, 2002.

\* cited by examiner

SYSTEM AND DEVICE BINDING METADATA WITH HARDWARE INTRINSIC PROPERTIES

CROSS REFERENCE TO RELATED APPLICATIONS

This application claims the benefit of the priority of provisional U.S. Patent Application Ser. No. 62/017,045 filed Jun. 25, 2014 and Ser. No. 61/988,848 filed May 5, 2014, both of which applications are incorporated by reference here.

BACKGROUND OF THE INVENTION

Authentication protocols generally rely on private information held by entities in order to establish identity. In traditional systems, the private data may consist of a username and password pair, personal identification numbers (PINs) or cryptographic keys. Multi-factor authentication protocols generally require two or more kinds of identifying information such as information the entity knows (e.g., a username and password), something the entity has (e.g., a smart card or token), and information representing what the entity is (e.g., a fingerprint).

Metadata comprises auxiliary information relating to the identity or state of an entity involved in authentication. Examples of metadata include biometric data, sensor output, global positioning data, passwords or PINs and similar auxiliary information that may be used to construct a characterization of an entity's identity or state. Biometric data comprises measurements of physical characteristics of a user (e.g., fingerprints, retina, iris, voice and vein patterns) that are adequately unique to be used as a proof of identity.

Systems that rely on sensor output, however, may be vulnerable to forged sensor output; and while biometric systems utilize a potent property for authentication, they can face challenges relating to the exposure and/or loss of sensitive biometric data. Since a sensor transforms a measured physical characteristic into a binary string, which is stored (enrolled) by the computer system and then compared to the binary strings subsequently generated by the sensor upon authentication requests, without further measures the system cannot distinguish between a string returned from the sensor and a string supplied by an adversary without the sensor. Thus for example an adversary may attempt to observe the output of a biometric sensor for a particular user and "clone" the user by supplying the surreptitiously-obtained biometric data to the system. An adversary may similarly attempt to clone a user by reading biometric data stored in the system. Further, since the features utilized in biometric systems tend by definition to be substantially immutable, the compromise of a user's biometric data cannot be remedied in the way that a lost user password can simply be changed.

Characteristics that are unique and intrinsic to individual hardware devices (e.g., wire resistance, initial memory state, CPU instruction timing) can also be extracted and used as part of authentication protocols. A leading example of this is the physical unclonable function (PUF). A PUF function $f(c)$ maps an input domain (or challenges) c to an output range (or response) r, where the mapping is defined based on characteristics unique to the device computing $f(\cdot)$. A circuit or hardware description of $f(\cdot)$ may be identical across all devices, yet the mapping from the domain to the range will be unique based on the specific hardware device executing the circuit computing $f(\cdot)$.

U.S. Pat. No. 8,577,091 to Ivanov et al. and U.S. Pat. No. 8,566,579 to Armstrong et al. describe authentication systems wherein intrinsic hardware characteristics (e.g., PUF output) as well as human biometrics are required to successfully complete an authentication, but neither provide a method for inexorably linking the PUF with the authentication or a method for handling non-sensitive sensor output.

Frikken et al. ("Robust Authentication using Physically Unclonable Functions," *Information Security*, volume 5735 of *Lecture Notes in Computer Science*, pages 262-277, Springer, 2009) teach a method for combining metadata (e.g., PIN) into the input of a PUF, but does not provide an extension to arbitrary metadata (e.g., biometrics) or non-sensitive metadata (e.g., temperature, pressure).

Rust (editor) in "D1.1 Report on use case and architecture requirements," Holistic Approaches for Integrity of ICT-Systems (2013) mentions the idea of merging biometric features with a cell-based PUF, but does not elaborate on a means for achieving this.

U.S. Patent Application Publication No. 20110002461 to Erhart et al. describes a method for authenticating sensor output by employing a PUF, which extracts unique characteristics of the physical sensor hardware. The method does not directly link the output of the sensor to the authentication of the hardware, however, and also requires that sensitive biometric sensor output leave the device.

SUMMARY OF THE INVENTION

An intrinsic identity of a device is constructed by generating an enrollment token or public key, which is based on intrinsic characteristics unique to the device such as a physical unclonable function (PUF). An authentication system utilizes the device's enrollment token or public key to verify the device's authenticity, preferably through a zero knowledge proof. Sensitive metadata is preferably also incorporated into the enrollment token or public key, which may be accomplished through an algorithmic means such as a hash function combining the metadata with hardware-intrinsic (e.g., PUF) data. The authentication may be interactive or non-interactive.

DETAILED DESCRIPTION OF EMBODIMENTS

Although the invention applies to the output of arbitrary sensors, an exemplary embodiment utilizing biometric sensors is described. The present invention is also described with reference to the example of an embodiment utilizing elliptic curve cryptography (including the associated terminology and conventions), but the inventive concept and teachings herein apply equally to various other cryptographic schemes such as ones employing different problems like discrete logarithm or factoring, and the invention is not limited by the various additional features described herein that may be employed with or by virtue of the invention. Before setting forth details of the invention, basic handling of PUF output, modeling assumptions, and primitives for PUF-based cryptographic schemes and threshold cryptography applicable to the example embodiment are described.

PUF output is noisy in that it varies slightly despite evaluating the same input. This is generally addressed with fuzzy extraction, a method developed to eliminate noise in biometric measurements. (See Juels et al., "A Fuzzy Commitment Scheme." *Proceedings of the 6th ACM conference on Computer and Communications Security*, CCS '99, pages 28-36, ACM, 1999). Fuzzy extraction may in part be employed within a device having a PUF such as within an auxiliary control unit, such that the output is constant for a fixed input. Fuzzy extraction (or reverse fuzzy extraction) may for example employ a "secure sketch," as described by Juels et al.

A secure sketch SS for input string O, where ECC is a binary (n, k, 2i+1) error correcting code of length n capable of correcting t errors and $V \leftarrow \{0, 1\}^k$ is a k-bit value, may be defined as $SS(O; V) = O \oplus ECC(V)$. This definition can be used to build a Gen algorithm, which outputs a set $\langle V, P \rangle$, where V is the value to be reconstructed and P is a helper string (which may be public) that is used to recover V.

---
Algorithm 1 Gen Algorithm
---
Input: A finite field $\mathbb{F}_n$ of order n; A challenge c
$O \leftarrow PUF(c)$
$V \in \mathbb{F}_n$
$P \leftarrow O \oplus ECC(V)$
return $\langle V, P \rangle$
---

Correspondingly, a Rep algorithm can be defined such that, on input O' within a maximum Hamming distance t of O, the original value V may be recovered. Rep(O', P), where D is the decoding scheme for the binary (n, k, 2t+1) error-correcting code ECC and O' is an input such that dist(O, O')≤t, can be defined as:

$$Rep(O', P) = D(P \oplus O')$$
$$= D(O \oplus ECC(V) \oplus O')$$
$$= V$$

This definition can then be used to build a Rep algorithm that allows a PUF output. O' that differs from the original output O by at most t to reproduce output V such that Rep(O')=V using the helper string $P = O \oplus ECC(V)$:

---
Algorithm 2 Rep Algorithm
---
Input: A challenge c, Helper string P
$O' \leftarrow PUF(c)$
$V \leftarrow D(P \oplus O')$
return V
---

Gen and Rep algorithms such as these may be used in PUF-based protocols to ensure that the same value V is recovered so long as the PUF outputs O, O' differ by at most t bits.

It is desirable that an adversary cannot predict a device's PUF response r for a challenge c with more than negligible probability (at least without physical access to the device), and that helper data does not reveal anything to an adversary about PUF responses. In assessing these security aspects, the following entities may be considered: a set of servers $\mathcal{S}$, where each server $s_i \in \mathcal{S}$ controls authentication of devices on its system; a set of devices $d_i \in \mathcal{D}$, each with an embedded PUF; and an adversary $\mathcal{A}$ that wishes to masquerade as a legitimate device $d_i \in \mathcal{D}$ to obtain resources stored on some subset of the servers $\mathcal{S}' \subseteq \mathcal{S}$. It may be assumed that all entities are bound to probabilistic polynomial-time (PPT), i.e., can only perform computation requiring polynomially many operations with respect to a global security parameter $\lambda$ (which refers to the number of bits in the relevant parameter). Computation requiring exponentially many operations with respect to $\lambda$ is not efficient for the agents, and will succeed with only negligible probability.

Games can be employed to assess a PPT adversary's advantage in (1) predicting a PUF's output, and (2) distinguishing helper data from a truly random string. It is sufficient to require that an adversary's advantage in a game is negligible with respect to the security parameter of the protocol, where a function $f(x): \mathbb{N} \mapsto \mathbb{R}$ is negligible if for every positive polynomial p(•) and sufficiently large x, the absolute value of $f(x)$ is less than 1/p(x). Although we describe exemplary games for capturing properties (1) and (2), they may be substituted for other game formulations designed to capture the concepts.

The unpredictability of a PUF can be assessed through the following game between an adversary $\mathcal{A}$ and a PUF device $P: \{0, 1\}^{\kappa_1} \mapsto \{0, 1\}^{\kappa_2}$ mapping input strings from the challenge space $\mathcal{C}_P$ of length $\kappa_1$ to the response space $\mathcal{R}_P$ of length $\kappa_2$ where $\lambda$ is the security parameter for the protocol, given in unary as $1^\lambda$.

---
Protocol 1: PUF-PRED: PUF Prediction Game
---

| | Adversary $\mathcal{A}$ | | PUF Device P | |
|---|---|---|---|---|
| (1) | $c_i \in \widetilde{\mathcal{C}}_P \subset \mathcal{C}_P,$ $0 \leq i \leq poly(\lambda)$ | → | | |
| | | ← | $r_i = P(c_i) \in \widetilde{\mathcal{R}}_P$ $\widetilde{\mathcal{R}}_P \subset \mathcal{R}_P,$ $0 \leq i \leq poly(\lambda)$ | (2) |
| (3) | Challenge $c \notin \widetilde{\mathcal{C}}_P$ | → | | |
| (4) | $c'_i \in \widetilde{\mathcal{C}}_P \subset \mathcal{C}_P$ $c \notin \widetilde{\mathcal{C}}_P$ $0 \leq i \leq poly(\lambda)$ | → | | |
| | | ← | $r'_i = P(c'_i) \in \widetilde{\mathcal{R}}'_P$ $\widetilde{\mathcal{R}}'_P \subset \mathcal{R}_P,$ $0 \leq i \leq poly(\lambda)$ | (5) |
| (6) | Guess $r' \stackrel{?}{\leftarrow} P(c)$ | → | | |

The game proceeds as follows:
1. The adversary $\mathcal{A}$ issues polynomnially many (w.r.t. the security parameter $\lambda$) challenges $c_i \in \widetilde{\mathcal{C}}_P$ to the PUF device P, where the challenge set $\widetilde{\mathcal{C}}_P$ is a proper subset of the entire challenge space $\mathcal{C}_P$.
2. The PUF device P returns the responses $\{r_i | r_i \leftarrow P(c_i)\}$ to $\mathcal{A}$.
3. The adversary $\mathcal{A}$ eventually outputs a challenge c that was not in the original set of challenge queries $\widetilde{\mathcal{C}}_P$. The adversary is not allowed to query the PUF device P on the committed challenge c.
4. The adversary $\mathcal{A}$ may once again issue a new set of polynomially many challenges $c'_i \in \mathcal{C}_P$ to the PUF device P. The adversary is not allowed to query the PUF device P on the committed challenge c.
5. The PUF device P returns the responses $\{r'_i | r'_i \leftarrow P(c'_i)\}$ to $\mathcal{A}$.
6. The adversary $\mathcal{A}$ eventually outputs a guess r' for P's response to the committed challenge c.

The probability of the adversary $\mathcal{A}$ guessing the correct response of the PUF P to the challenge c is then $\text{Adv}_{\mathcal{A}}^{\text{PUF-PRED}}(\kappa_2) := \Pr[r=r']$. That is, the adversary only wins the game when $\mathcal{A}$'s guess $r'$ is equal to P's actual response $r \leftarrow P(c)$ to $\mathcal{A}$'s committed challenge c. (Technically, the PUF:'s output is noisy and will vary slightly on any fixed input. Thus, the equality is taken with respect to the output of a fuzzy extractor (e.g., Dodis et al.).).

In the PUF indistinguishability game, an adversary $\mathcal{A}$ is asked to differentiate between the output r of the fuzzy extractor for a PUF P and a randomly chosen string $s \in \{0, 1\}^l$ of the same length l.

Protocol 2: PUF-IND: PUF Indistinguishability Game

| Adversary $\mathcal{A}$ | | PUF Device P | |
|---|---|---|---|
| (1) $c_i \in \mathcal{CH} \subset \mathcal{C}_P$, $0 \leq i \leq \text{poly}(\lambda)$ | $\rightarrow$ | $(R_i, H_i) \leftarrow \text{Gen}(r_i = P(c))$ | |
| | $\leftarrow$ | $H_i \in \overline{\mathcal{R}}_P \subset \mathcal{R}_P$, $0 \leq i \leq \text{poly}(\lambda)$ | (2) |
| (3) $c_i \in \overline{\mathcal{CH}} \subset \mathcal{C}_P$, $0 \leq i \leq \text{poly}(\lambda)$ | $\rightarrow$ | | |
| | $\leftarrow$ | $R_i \in \overline{\mathcal{R}}_P \subset \mathcal{R}_P$, $0 \leq i \leq \text{poly}(\lambda)$ | (4) |
| (5) Challenge $c \notin \overline{\mathcal{CH}}$ | $\rightarrow$ | $b \in \{0, 1\}$ | |
| | $\leftarrow$ | $b(s \in \{0, 1\}^l) + (1 - b)(R_i)$, $R_i = \text{Rep}(P(c), H_i)$ | (6) |
| (7) $c'_i \in \mathcal{CH} \subset \mathcal{C}_P$, $c \neq c'_i$, $0 \leq i \leq \text{poly}(\lambda)$ | $\rightarrow$ | | |
| | $\leftarrow$ | $R'_i \in \overline{\mathcal{R}}_P \subset \mathcal{R}_P$, $0 \leq i \leq \text{poly}(\lambda)$ | (8) |
| (9) Guess $b' \stackrel{?}{=} b$ | $\rightarrow$ | | |

This game proceeds as follows:

1. Adversary $\mathcal{A}$ executes the enrollment phase on any challenge $c_i \in \mathcal{C}_P$.
2. The PUF device returns the corresponding helper string $H_i$ from the output of Gen. Denote this set of challenge-helper pairs $(c_i, H_i)$ as $\mathcal{CH}$.
3. Adversary $\mathcal{A}$ now requests the PIF response $r_i = P(c_i)$ for any $c_i \in \mathcal{CH}$. Denote the set of requested challenges in this step $\overline{\mathcal{CH}}$.
4. For all requests $c_i \in \overline{\mathcal{CH}}$, the PUF device returns the set $\{r_i | r_i \leftarrow P(c_i)\}$.
5. Adversary $\mathcal{A}$ selects a challenge $c \notin \overline{\mathcal{CH}}$, such that $\mathcal{A}$ has $H_i$ but not $R_i$ for c. The PUF device chooses a bit $b \in \{0, 1\}$ uniformly at random.
6. If $b=0$, $\mathcal{A}$ is given $R_i = \text{Rep}(P(c) = r_i, H_i)$. Otherwise, if $b=1$ then $\mathcal{A}$ is given a random string $s \in \{0, 1\}^l$.
7. Adversary $\mathcal{A}$ is allowed to query the PUF device for $c'_i \in \mathcal{CH}$ so long as no $c'_i = c$.
8. For all requests $c'_i \neq c$, the PUF device returns the set $\{r_i | r_i \leftarrow P(c'_i)\}$.
9. The adversary outputs a guess bit $b'$, and succeeds when $b' = b$.

Types of PUFs

Rührmair et al. ("Modeling Attacks on Physical Unclonable Functions," Proceedings of the 17th ACM conference on Computer and communications security, CCS '10, pages 237-249, ACM, 2010) define three distinct classes of PUF devices:

1. A Weak PUF is typically used only to derive a secret key. The challenge space may be limited, and the response space is assumed to never be revealed. Typical constructions include the SRAM (Holcomb et al., "Initial SRAM State as a Fingerprint and Source of True Random Numbers for RFID Tags," In Proceedings of the Conference on RFID Security, 2007), Butterfly (Kumar et al., "Extended abstract: The Butterfly PUF Protecting IP on Every FPGA," IEEE International Workshop on Hardware-Oriented Security and Trust, pages 67-70, 2008), Arbiter (Lee et al., "A technique to build a secret key in integrated circuits for identification and authentication applications," IEEE Symposium on VLSI Circuits: Digest of Technical Papers, pages 176-179, 2004), Ring Oscillator (Suh et al., "Physical Unclonable Functions for Device Authentication and Secret Key Generation." Proceedings of the 44th annual Design Automation Conference, DAC '07, pages 9-14, ACM, 2007), and Coating (Tuyls et al., "Read-Proof Hardware from Protective Coatings," Proceedings of the 8th international conference on Cryptoqraphic Hardware and Embedded Systems, CHES'06, pages 369-383, Springer, 2006) PUFs.

2. A Strong PUF is assumed to be (i) physically impossible to clone, (ii) impossible to collect a complete set of challenge response pairs in a reasonable time (typically taken to be on the order of weeks), and (iii) difficult to predict the response to a random challenge. For example, the super-high information content (SHIC) PUF described by Rührmair ("Applications of High-Capacity Crossbar Memories in Cryptography," IEEE Trans. Nanotechnol., volume 10, no. 3:489-498, 2011) may be considered a. Strong PUF.

3. A Controlled PUF satisfies all of the criteria for strong PUFs, and additionally implements an auxiliary control unit capable of computing more advanced functionalities to cryptographically augment protocols. A controlled PUF should ideally satisfy the five conditions below.

One definition for an ideal physical unclonable function $P_d : \{0, 1\}^{\kappa_1} \mapsto \{0, 1\}^{\kappa_2}$ bound to a device d that the function preferably exhibits the following properties:

1. Unclonable: Ideally, $\Pr[\text{dist}(y, x) \leq t | x \leftarrow U_{\kappa_1}, y \leftarrow P(x), z \leftarrow P'] \leq \epsilon_1$, the probability of duplicating PUF P with a clone PUF P', such that their output distributions are t-statistically close is less than some sufficiently small $\epsilon_1$.

2. Unpredictable: Ideally, $\text{Adv}_{\mathcal{A}}^{\text{PUF-PRED}}(\kappa_2) := \Pr[r=r']$, denoting the probability of the adversary $\mathcal{A}$ guessing the correct response r of the PUF P to the challenge c, is negligible in $\kappa_2$ for all probabilistic polynomial time (PPT) adversaries $\mathcal{A}$. This refers to the decisional variant of the PUF unpredictability game described in Protocol 1.

3. Robust: Ideally, $\Pr[\text{dist}(y, z) > t | x \leftarrow U_{\kappa_1}, y \leftarrow P(x), z \leftarrow P(x)] \leq \epsilon_2$, i.e., the probability of a fixed PUF P yielding responses i-distant on the same input x is less than some sufficiently small $\epsilon_2$. This property is satisfied by binding the PUF device d with a (m, l, t, $\epsilon_3$) fuzzy extractor (Gen, Rep).

4. Fuzzy Extraction: Ideally, during the enrollment phase for a noisy PUF P, given a challenge c, the PUF computes $(R, H) \leftarrow \text{Gen}(r)$, where $r \leftarrow P_d(c)$ and outputs H. The helper string H allows for R to be recovered when the challenge r' is t-close to the original challenge r.

5. Indistinguishability: Ideally, the output of the PUF is computationally indistinguishable from a random string of the same length, such that the advantage of a PPT adversary $\mathcal{A}$ is $\text{Adv}_{\mathcal{A}}^{\text{PUF-IND}}(l) \leq \frac{1}{2} + \epsilon_3$, where $\epsilon_3$ is negligible. This requires that the adversary distinguishes between a random string, s, and the output of the fuzzy extractor, $R_i$, with probability at most negligibly more than ½. Thus, $\text{Adv}_A^{PUF-IND} - ½ \le \epsilon_3$, where $\epsilon_3$ is negligible.

However, alternate definitions (e.g., Hori et al., "Quantitative and Statistical Performance Evaluation of Arbiter Physical Unclonable Functions on FPGAs," 2010 *International Conference on Reconfigurable Computing and FPGAs (ReConFig)*, pages 298-303, 2010; Maiti, *A Systematic Approach to Design an Efficient Physical Unclonable Function*, dissertation, Virginia Tech, 2012) for an ideal physical unclonable function may be substituted.

In the example of an embodiment employing elliptic curve cryptography, Algorithms 3 and 4 below can be used to allow a. PUF-enabled device to locally store and retrieve a sensitive value without storing any sensitive information in non-volatile memory. Algorithm 3 illustrates the storing of a sensitive value $V_i$ using a PUF, and Algorithm 4 illustrates the dynamic regeneration of $V_i$. The challenge $c_i$ and helper data helper, can be public, as neither reveals anything about the sensitive value $V_i$. While the present example uses encryption of $V_i$ by exclusive-or, $\oplus$, $V_i$ could also be used as a key to other encryption algorithms (e.g., AES) to enable storage and retrieval of arbitrarily sized values.

---
Algorithm 3 PUF-Store
---

Goal: Store value $v_i$
for PUF Device d do
    Select finite field $\mathbb{F}_p$ of order p
    Select E, an elliptic curve over $\mathbb{F}_p$
    Find $G \in E/\mathbb{F}_p$, a base point of order q
    Select challenge $c_i \in \mathbb{F}_p$
    x = H($c_i$, E, G, p, q)
    O = PUF(x)
    $helper_i = P_i = O \oplus ECC(v_i)$
    Write $\{c_i, helper_i\}$ to non-volatile memory
end for

---

---
Algorithm PUF-Retrieve
---

Goal: Retrieve value $v_i$
for PUF Device d do
    Read $\{c_i, helper_i\}$ from non-volatile memory
    x $\leftarrow$ H($c_i$, E, G, p, q)
    O' = PUF(x)
    $v_i \leftarrow D((ECC(v_i) \oplus O) \oplus O'$
end for

---

Whenever O and O' are t-close, the error correcting code ECC can be passed to a decoding algorithm D which will recover the sensitive value $V_i$.

Enrollment

In order to construct an intrinsic identity of a device, a public representation of the device's identity (referred to here as an enrollment token or public key) must be generated. In this process of device enrollment, a cryptographic enrollment, token is collected from the device. An elliptic curve mathematical framework for enrollment and authentication may be used, but those skilled in the art will realize that other embodiments (e.g., discrete logarithm frameworks, in which regard U.S. Pat. No. 8,918,647 is incorporated here by reference) will provide the same functionality. Using Algorithm 5, a local device can perform an enrollment protocol using the PUF.

This allows each PUF circuit to generate a local public key $p_i^{pub}$, which is useful for bootstrapping more complex key setup algorithms. When the key setup algorithm is performed internal to the device (rather than externally among a set of distinct devices), this bootstrap process may not be necessary.

---
Algorithm 5 Enrollment Algorithm
--- for Device d do
    $c_i \in \mathbb{F}_p$, a group element
    x = H($c_i$, E, G, p q)
    O = PUF(x)
    $helper_i = O \oplus ECC(p_i^{priv} \mod q)$
    $p_i^{pub} = A_i = p_i^{priv} \cdot G \mod p$
    Store $\{p_i^{pub}, (c_i, helper_i)\}$
end for

---

Zero Knowledge Proofs

A zero knowledge proof (ZKP) of knowledge is a method for proving that a given statement is true, while revealing nothing beyond this fact. The ZKP is an interaction between two parties: a prover $\mathcal{P}$ that wishes to establish the validity of a statement, and a verifier V that must be convinced the statement is true. At, the conclusion of the protocol, the verifier should be convinced with overwhelming probability that a true statement is indeed true. Correspondingly, an adversary should only succeed in convincing the verifier of a false statement with negligible probability. The proof is zero knowledge in the sense that the verifier could not use the messages from a previous proof to convince a new party of the statement's validity, and the messages reveal only a single bit of information: whether or not the prover $\mathcal{P}$ possesses the secret. There are two general classes of zero knowledge proofs: interactive ZKPs, where a series of messages are exchanged between the prover $\mathcal{P}$ and verifier V, and non-interactive ZKPs, where the prover $\mathcal{P}$ publishes a single message $\mathcal{M}$ without interaction with V, yet V is convinced that $\mathcal{P}$ possesses the secret.

The requirement for communication from the verifying server in an interactive zero knowledge proof is to obtain a nonce value specific to the current proof. This prevents an eavesdropping adversary from using previous proofs from a valid device to successfully complete an authentication protocol and masquerade as the device. A non-interactive zero knowledge proof removes this communication requirement, and allows the proof to be completed without interacting with the verifying end point.

Achieving a non-interactive construction requires the proving device to generate the nonce on behalf of the verifier in a manner that prevents the proving end device from manipulating the proof. One method for constructing a non-interactive zero knowledge proof is for the device to construct a nonce N as $N \leftarrow H(A\|\tau)$, where A is the device's public key, $H(\cdot)$ is a cryptographic hash function, $\tau$ is a timestamp and $x\|y$ denotes concatenation of x and y. The timestamp ensures that previous proofs constructed by the proving device cannot be replayed by an adversary in the future, while the hash function ensures that the proving device cannot manipulate the nonce in an adversarial manner. The reliance on timestamps is substantially less onerous than reliance on globally synchronized clocks. That is, the timestamp need not match the current timestamp on arrival at the prover exactly, which eliminates the potential of network delay to affect the proof. Rather, the verifying end point checks that the timestamp is reasonably current (e.g., second granularity) and monotonically increasing to prevent replay attacks. An exemplary non-interactive zero knowledge proof for a PUF-enabled device is described in Algorithm 6.

---
Algorithm 6 Non-Interactive Authentication Algorithm
---

```
for PUF Device d do
    v_i ← PUF-Retrieve(c_i, h_i)
    A_i = v_i · G mod p
    r ← random ∈ 𝔽_n, a random group element
    B ← r · G mod p
    N ← Hash(A||τ) where τ is the current timestamp
    c ← Hash(G, B, A, N)
    m ← r + c · v_i mod q
    Server s ← {B, m, τ}
end for
for Server s do
    A_i = v_i · G mod p (public key stored from device enrollment)
    Verify τ is reasonably current (e.g., τ = current time − ε)
    N ← Hash(A||τ)
    c' ← Hash(G, B, A, N)
    P ← m · G − c' · A mod p Device d ← { accept:  P = B
                { deny:    P ≠ B end for
```

Hash Functions

In general, a hash function is defined as $H(\bullet):\{0, 1\}^* \mapsto \{0, 1\}^\lambda$, where $\lambda$ is a fixed constant. That is, a hash function $H(\bullet)$ (or written explicitly as Hash($\bullet$)) takes an input of arbitrary size, and maps to a finite output domain. For cryptographic settings, hash functions must satisfy additional properties. In the context of binding metadata in authentication protocols, the following are particularly relevant:

1. One-Way: computationally infeasible to determine the input x when given the output H(x).
2. Collision Resistant: computationally infeasible to find a pair $\{(x,y)|x \neq y, H(x)=H(y)\}$.
3. Avalanche Condition: each bit of $H(\bar{x})$ is complemented from $H(x)$ with probability ½, where x is any hash input and $\bar{x}$ is x with a single bit complemented.

The one-way property ensures that the output H(x) does not reveal anything about the input x. The collision resistant property ensures that it is computationally infeasible to provide a different set of metadata y such that H(x)=H(y), where x is the proper metadata for a given entity. The avalanche condition ensures that the output H(x) changes substantially in response to a minor change to the input x, which allows any change to the metadata to be detected and force a failed authentication.

Metadata Binding

Let metadata binding refer to the process of incorporating auxiliary metadata into the authentication process. Metadata is arbitrary auxiliary information upon which the authentication protocol should depend. That is, without the correct metadata, the authentication should fail. Metadata may be characterized as either sensitive or non-sensitive, where sensitive metadata should not leave the device (e.g., password, PIN, biometric) and non-sensitive metadata may leave the device (e.g., sensor output on temperature, pressure).

Sensitive metadata is incorporated into the public identity token created during enrollment. For example, when no sensitive metadata is provided, device enrollment outputs a public identity that characterizes only the device. However, when sensitive metadata is provided during enrollment (e.g., biometrics, PIN, etc.), the public identity characterizes both the device and the sensitive metadata. One embodiment of the invention never requires the sensitive metadata to leave the device, as the zero knowledge proof protocol is completed without the verifier having access to the sensitive metadata.

Non-sensitive metadata is not incorporated into the enrollment process. Thus, the public identity output from enrollment does not depend on non-sensitive metadata (e.g., sensor output for temperature, pressure, etc.). Rather, non-sensitive metadata is incorporated into the zero knowledge proof protocol, such that the proof of device and/or user authenticity is only valid if the corresponding non-sensitive metadata is also provided to the verifier. This allows the device and/or user to have a single public identity, and yet a verifier given access to the non-sensitive metadata can verify both the authenticity of the device and/or user as well as the origin of the metadata.

Figure 1:
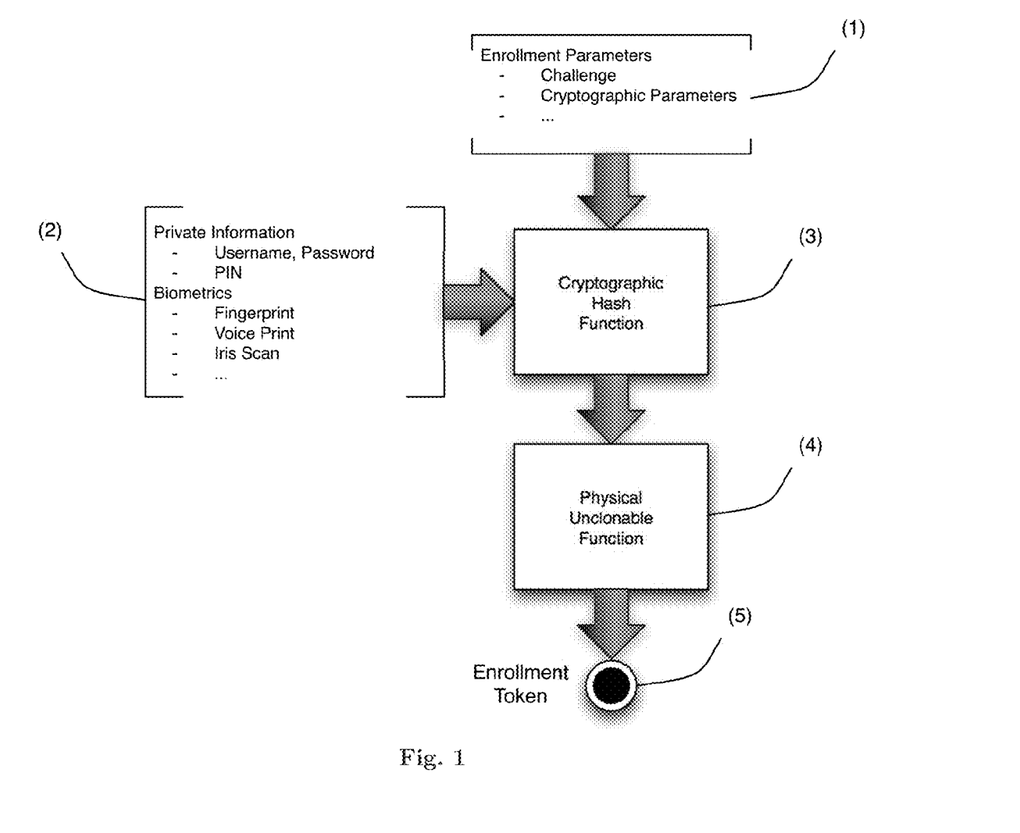
FIG. 1 is an illustration of the identity metadata binding operational flow.

FIG. 1 illustrates the process flow of metadata binding. First, Enrollment Parameters 1 are retrieved and may be combined with Identity Metadata 2 through a Cryptographic Hash Function 3. The output of the cryptographic hash function is used as input to the Physical Unclonable Function 4, which links the enrollment parameters and optional metadata to the hardware identity. Finally, an Enrollment Token 5 is returned as a function of the PUF output.

Due to the avalanche property of hash functions (where a single bit difference in the input results in each bit of the output flipping with approximately 50% probability), the metadata must be exactly the same in order for the authentication to succeed. However, the exemplary embodiment of biometric authentication frequently results in noise, where scans differ slightly despite observing the same characteristic (e.g., fingerprint, iris, etc.). Thus, means such as a fuzzy extractor may preferably be employed to ensure that the biometric reliably returns a constant value. For example, a constant value $\mathcal{M}_i$ for the metadata may be chosen and linked to an associated public helper data value $h_i^\mathcal{M}$. A noisy biometric scan $\mathcal{S}$ can then be used to compute $h_i^\mathcal{M} \leftarrow$ ECC($\mathcal{M}_i) \oplus \mathcal{S}$ where ECC is an error correcting code, and given access to a new biometric scan $\mathcal{S}'$ that is t-close to $\mathcal{S}$, the constant value $\mathcal{M}_i$ can be recovered by computing $\mathcal{M}_i \leftarrow$ D($h_i^\mathcal{M} \oplus \mathcal{S}'$) where D is the corresponding error decoding algorithm.

Incorporating metadata into the construction requires re-defining the PUF-Store functionality described in Algorithm 3. Algorithm 7 provides an example of how metadata $\mathcal{M}_i$ may be hashed into the PUF input x, which is used to protect the committed value $V_i$.

---
Algorithm 7 PUF-Store-Metadata
---

```
Goal: Store value v_i requiring Sensitive Metadata 𝓜_i
for PUF Device d do
    Select finite field 𝔽_p of order p
    Select E, an elliptic curve over 𝔽_p
    Find G ∈ E/𝔽_p, a base point of order q
    Select challenge c_i ∈ 𝔽_p
    x = H(c_i, 𝓜_i, E, G, p, q)
    O = PCF(x)
    helper_i = P_i = O ⊕ ECC(v_i)
    Write {c_i, helper_i} to non-volatile memory
end for
```

While in the present example the PUF input consists of a hash of a challenge value, a metadata value, the elliptic curve E, base point C, and moduli p and q, various other permutations of values (pertinent to the mathematical framework used) may be hashed to produce a PIF input incorporating metadata in other embodiments. Moreover, one or more values can be iteratively hashed and/or hashed values can be nested (e.g., $H(H(c_i \| \mathcal{M}_i), E, G, p, q)$, etc.). Further, other methods for linking and/or combining the parameters (e.g., an all-or-nothing transformation) may be employed.

Similarly, the PUF-Retrieve functionality described in Algorithm 4 must be modified to require the sensitive metadata $\mathcal{M}_i$ in order to recover the committed value $V_i$. Algorithm 8 describes how metadata $\mathcal{M}_i$ in combination with the PUF is used to recover the committed value $V_i$.

---
Algorithm 8 PUF-Retrieve-Metadata
---
Goal: Retrieve value $v_i$
for PUF Device d do
    Read $\{c_i, \text{helper}_i\}$ from non-volatile memory
    $x \leftarrow H(c_i, \mathcal{M}_i, E, G, p, q)$
    $O' = \text{PUF}(x)$
    $v_i \leftarrow D((\text{ECC}(v_i) \oplus O) \oplus O')$
end for

---

Non-Interactive Zero Knowledge Proof Binding Metadata

Figure 2:
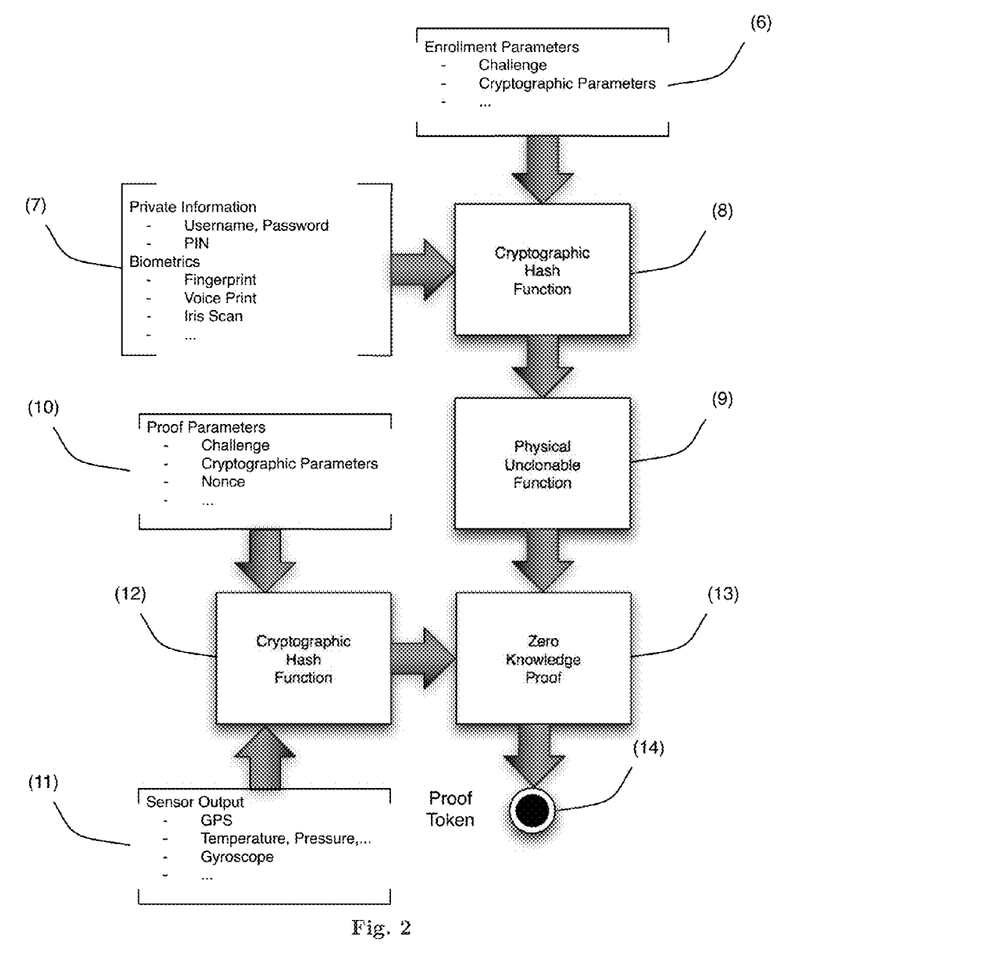
FIG. 2 is an illustration of the zero knowledge proof generation for arbitrary sensor output.

Returning to the exemplary embodiment of biometric authentication (e.g., fingerprint scanner), FIG. 2 illustrates the process flow of constructing a zero knowledge proof demonstrating sensor integrity, user authentication, and sensor output verification. First, Enrollment Parameters 6 are retrieved and may be combined with Identity Metadata 7 through a Cryptographic Hash Function 8. The output of the cryptographic hash function is used as input to the Physical Unclonable Function 9, which links the enrollment parameters and identity metadata to the hardware identity. Next, the Proof Parameters 10 and Sensor Output 11 are linked through a Cryptographic Hash Function 12. The output of Physical Unclonable Function 9 and Cryptographic Hash Function 12 are synthesized to generate a Zero Knowledge Proof 13, which outputs a Proof Token 14 that will convince a verifier of the integrity of the sensor, authenticate the user, and validate the sensor output.

Algorithm 9 provides an example of how a fingerprint scan may be bound to the authentication protocol such that both the device and fingerprint must match those originally enrolled. Non-sensitive metadata (e.g., sensor output for temperature, pressure, etc.) $\mathcal{M}_i^{pub}$ may be incorporated into the non-interactive authentication algorithm by incorporating it into the construction of the nonce N, and providing $\mathcal{M}_i^{pub}$ to the verifier. Thus, the verifier is only able to construct the nonce N (and, consequently, the variable c') if $\mathcal{M}_i^{pub}$ matches the output from the sensor.

---
Algorithm 9 Device & Fingerprint Authentication Algorithm
---
for User do
    Scan Fingerprint
    $\overline{FP} \leftarrow \text{Scan}$
    Read Fingerprint Helper Data $h_i^{\mathcal{M}}$
    $\mathcal{M}_i^{FP} \leftarrow \text{ECC}(h_i^{\mathcal{M}} \oplus \overline{FP})$
end for
for PUF Device d do
    $v_i \leftarrow \text{PUF-Retrieve}(c_i, \mathcal{M}_i^{FP}, h_i)$
    $A_i = v_i \cdot G \mod p$
    $r \leftarrow \text{random} \in \mathbb{F}_n$, a random group element
    $B \leftarrow r \cdot G \mod p$
    $N \leftarrow \text{Hash}(A \| \mathcal{M}_i^{pub} \| \tau)$ where $\tau$ is the current timestamp
    $c \leftarrow \text{Hash}(G, B, A, N)$
    $m \leftarrow r + c \cdot v_i \mod q$
    Server $s \leftarrow \{B, m, \mathcal{M}_i^{pub}, \tau\}$
end for
for Server s do
    $A_i = v_i \cdot G \mod p$ (public key stored from device enrollment)
    $N \leftarrow \text{Hash}(A \| \mathcal{M}_i^{pub} \| \tau)$ ---
Algorithm 9 Device & Fingerprint Authentication Algorithm
---
    $c' \leftarrow \text{Hash}(G, B, A, N)$
    $P \leftarrow m \cdot G - c' \cdot A \mod p$
    Device $d \leftarrow \begin{cases} \text{accept:} & P = B \\ \text{deny:} & P \neq B \end{cases}$
end for

---

First, a user's fingerprint scan FP is used in combination with the helper data $h_i^{\mathcal{M}}$ for the original fingerprint scan FP to recover the metadata value $\mathcal{M}_i$. Next, the metadata value $\mathcal{M}_i$ is used as input to the PUF, such that the PUF output depends on the metadata. In order to bind non-sensitive metadata $\mathcal{M}_i^{pub}$ to the proof, it is used to construct the nonce N, which depends on the public identity A as well as the current timestamp $\tau$ (which prevents replay attacks). The non-sensitive metadata $\mathcal{M}_i^{pub}$ is then provided to the verifier, as it is now necessary to verify the proof. (If the non-sensitive metadata should only be revealed to the verifier, it may be sent encrypted). Finally, the device constructs the non-interactive zero knowledge proof, which enables the server to verify if both the device and (sensitive and non-sensitive) metadata are correct.

A non-interactive zero knowledge proof may also be constructed by requiring the server to issue a nonce N to the device. This exemplary construction is illustrated in Algorithm 10.

---
Algorithm 10 Interactive Device & Fingerprint Authentication Algorithm
---
for Server s do
    Send nonce $N \in \{0, 1\}^\lambda$ to Device, where $\lambda$ is the number of bits in the modulus p
end for
for User do
    Scan Fingerprint
    $\overline{FP} \leftarrow \text{Scan}$
    Read Fingerprint Helper Data $h_i^{\mathcal{M}}$
    $\mathcal{M}_i^{FP} \leftarrow \text{ECC}(h_i^{\mathcal{M}} \oplus \overline{FP})$
end for
for PUF Device d do
    $v_i \leftarrow \text{PUF-Retrieve}(c_i, \mathcal{M}_i^{FP}, h_i)$
    $A_i = v_i \cdot G \mod p$
    $r \leftarrow \text{random} \in \mathbb{F}_n$, a random group element
    $B \leftarrow r \cdot G \mod p$
    $c \leftarrow \text{Hash}(G, B, A, N)$
    $m \leftarrow r + c \cdot v_i \mod q$
    Server $s \leftarrow \{B, m, \mathcal{M}_i^{pub}\}$
end for
for Server s do
    $A_i = v_i \cdot G \mod p$, (public key stored from device enrollment)
    $c' \leftarrow \text{Hash}(G, B, A, N)$
    $P \leftarrow m \cdot G - c' \cdot A \mod p$
    Device $d \leftarrow \begin{cases} \text{accept:} & P = B \\ \text{deny:} & P \neq B \end{cases}$
end for

---

The addition of (sensitive and/or non-sensitive) metadata is optional in embodiments of the invention. That is, non-sensitive metadata may be included while sensitive metadata is excluded. This requires only that the public identity token did not incorporate the sensitive metadata. Similarly, sensitive metadata may be included while non-sensitive metadata is excluded. This requires only that the nonce is not constructed using non-sensitive metadata.

Extension to Role Based Access Control

As one embodiment of our invention relies on an elliptic curve mathematical framework, one skilled in the art will realize that it may be extended to support cryptographically-enforced role based access control (RBAC). That is, data access policies and device credentials may be specified mathematically, and the RBAC algorithm computes a function $f(\mathcal{P}, \mathcal{C}) \mapsto \{0, 1\}$ mapping policies $\mathcal{P}$ and credentials $\mathcal{C}$ to an access decision in $\{0, 1\}$. This is typically accomplished by constructing a bilinear pairing (e.g., Weil or Tate pairing), and is a natural extension of our invention.

While the foregoing embodiments have been described with various features, one of ordinary skill in the art will recognize that, the authentication protocol need not be limited to zero knowledge, and could be based on other cryptographic constructions for establishing identity. For example, the device could use its hardware identity to digitally sign the contents of a packet, and include this signature in the packet header (e.g., TCP Options Header, where an example header would include $\{B=r \cdot G \mod p, m=r+\text{Hash}(G, B, AB, N)\cdot \text{rand} \mod q, \tau\}$) and the hardware identity may be applied to a variety of other cryptographic authentication techniques, and need not be limited by the zero knowledge aspect of the example provided.

What is claimed is:

1. An authentication device configured to bind authentication-related metadata with hardware-intrinsic properties, the device comprising:
    a) a hardware root of trust constructed to generate, in response to receiving an input value an output value characteristic to the hardware root of trust and to the input value; and
    b) a processor connected to the hardware root of trust configured to:
        i) combine device enrollment parameters associated with the authentication device and authentication-related metadata associated with the device to produce a binding value;
        ii) communicate the binding value to the hardware root of trust and receive an output value from the hardware root of trust, wherein the output value is generated as a function of the hardware root of trust, the device enrollment parameters, and the authentication-related metadata that were combined to produce the binding value; and
        iii) create an authentication proof token as a function of the output value.

2. The device of claim 1, wherein the processor is further configured to, in response to an authentication request from an external verifying entity, perform an authenticating zero knowledge proof.

3. The device of claim 2, wherein the authenticating zero knowledge proof that the processor is configured to perform is non-interactive and includes a nonce that incorporates non-sensitive metadata.

4. The device of claim 2, wherein the authenticating zero knowledge proof that the processor is configured to perform is interactive.

5. The device of claim 1, wherein the processor is configured to combine device enrollment parameters with authentication-related metadata using a cryptographic hash function.

6. The device of claim 1, wherein the processor is configured to combine device enrollment parameters with authentication-related metadata using an iterative cryptographic hash function.

7. The device of claim 1, wherein the authentication-related metadata that the processor is configured to algorithmically combine with device enrollment parameters consists solely of sensitive metadata.

8. The device of claim 1, wherein the authentication proof token that the processor is configured to create is a public identity token.

9. The device of claim 1, wherein the authentication-related metadata that the processor is configured to combine with device enrollment parameters consists solely of sensitive metadata, and wherein the authentication proof token that the processor is configured to create is a public identity token.

10. The device of claim 1, wherein the device enrollment parameters that the processor is configured to combine with authentication-related metadata include values pertaining to a cryptographic mathematical framework.

11. The device of claim 10, wherein the processor is further configured to perform elliptic curve cryptography.

12. The device of claim 11, wherein the values pertaining to a cryptographic mathematical framework include a challenge value, an elliptic curve base point, and a modulus.

13. The device of claim 1, wherein the processor is further configured to, in response to an authentication request from an external verifying entity, perform an authenticating zero knowledge proof without conveying any sensitive metadata to the external verifying entity.

14. The device of claim 1, wherein the hardware root of trust is a physical unclonable function ('PUF') circuit, and wherein the PUF is constructed to generate, in response to the input of a specific challenge value, an output value that is characteristic to the PUF and the specific challenge value.

15. The device of claim 14, wherein the processor is further configured to, in response to an authentication request from an external verifying entity, perform an authenticating zero knowledge proof without conveying any sensitive metadata to the external verifying entity.

16. The device of claim 14, wherein the processor is configured to combine device enrollment parameters that include a challenge value.

17. The device of claim 15, wherein the processor is configured to combine device enrollment parameters that include a challenge value.

18. The device of claim 14, wherein the processor is further configured to, in response to an authentication request from an external verifying entity, perform an authenticating zero knowledge proof.

19. The device of claim 14, wherein the processor is configured to combine device enrollment parameters with authentication-related metadata using a cryptographic hash function.

20. The device of claim 14, wherein the authentication proof token that the processor is configured to create is a public identity token.

* * * * *